US005486674A

United States Patent [19]

Lynum et al.

[11] Patent Number: 5,486,674

[45] Date of Patent: Jan. 23, 1996

[54] PLASMA TORCH DEVICE FOR CHEMICAL PROCESSES

[75] Inventors: Steinar Lynum; Kjell Haugsten, both of Oslo; Ketil Hox; Jan Hugdahl, both of Trondheim, all of Norway

[73] Assignee: Kvaerner Engineering AS, Lysaker, Norway

[21] Appl. No.: 244,295

[22] PCT Filed: Dec. 11, 1992

[86] PCT No.: PCT/NO92/00195

§ 371 Date: Dec. 29, 1994

§ 102(e) Date: Dec. 29, 1994

[87] PCT Pub. No.: WO93/12633

PCT Pub. Date: Jun. 24, 1993

[30] Foreign Application Priority Data

Dec. 12, 1991 [NO] Norway .................................. 914907

[51] Int. Cl.[6] .................................................. B23K 10/00

[52] U.S. Cl. ............................. 219/121.52; 219/121.48; 219/121.54

[58] Field of Search ......................... 219/74, 75, 121.48, 219/121.5, 121.51, 121.52, 121.54; 313/231.21, 231.31; 315/111.21, 111.51

[56] References Cited

U.S. PATENT DOCUMENTS

| | | | |
|---|---|---|---|
| 3,521,106 | 7/1970 | Hess . | |
| 3,832,513 | 8/1974 | Klasson | 219/75 |
| 4,009,413 | 2/1977 | Elliott et al. | 219/121 P |
| 4,275,287 | 6/1981 | Hiratake | 219/121.52 |
| 4,341,941 | 7/1982 | Tateno | 219/121.52 |
| 4,390,772 | 6/1983 | Hiratake . | |
| 4,481,636 | 11/1984 | Curr et al. | 219/121.52 |
| 4,710,607 | 12/1987 | Wilhelmi et al. | 219/121.52 |
| 5,103,072 | 4/1992 | Eikeland et al. | 219/121.52 |
| 5,144,110 | 9/1992 | Marantz et al. | 219/121.48 |
| 5,210,392 | 5/1993 | Labrot et al. | 219/121.49 |

FOREIGN PATENT DOCUMENTS

| | | |
|---|---|---|
| 2162290 | 6/1972 | Germany . |
| 3328777 | 2/1985 | Germany . |
| 3840485 | 6/1990 | Germany . |
| 1227179 | 4/1971 | United Kingdom . |
| 1354806 | 5/1974 | United Kingdom . |
| 2014412 | 8/1979 | United Kingdom . |
| 2116408 | 9/1983 | United Kingdom . |

*Primary Examiner*—Mark H. Paschall
*Attorney, Agent, or Firm*—Cushman Darby & Cushman

[57] ABSTRACT

A plasma torch is designed for energy supply for example for chemical processes. The plasma torch comprises at least three solid tubular electrodes (1, 2 and 3) located coaxially inside one another. The electrodes (1, 2, 3) can be moved axially in relation to one another. They are preferably electrically insulated (5, 6, 7) from one another and have connections for electrical power (8, 9, 10). When three electrodes are used, the middle electrode (2) is used as an auxiliary electrode or ignition electrode. It is then coupled with one of the other electrodes (1). The distance to third electrode (3) is adapted to the working voltage in such a way that a jump spark is obtained when the working voltage is connected. During operation the auxiliary electrode (2) is withdrawn from the plasma zone thus preventing it from continuously forming the foot point of the arc.

2 Claims, 1 Drawing Sheet

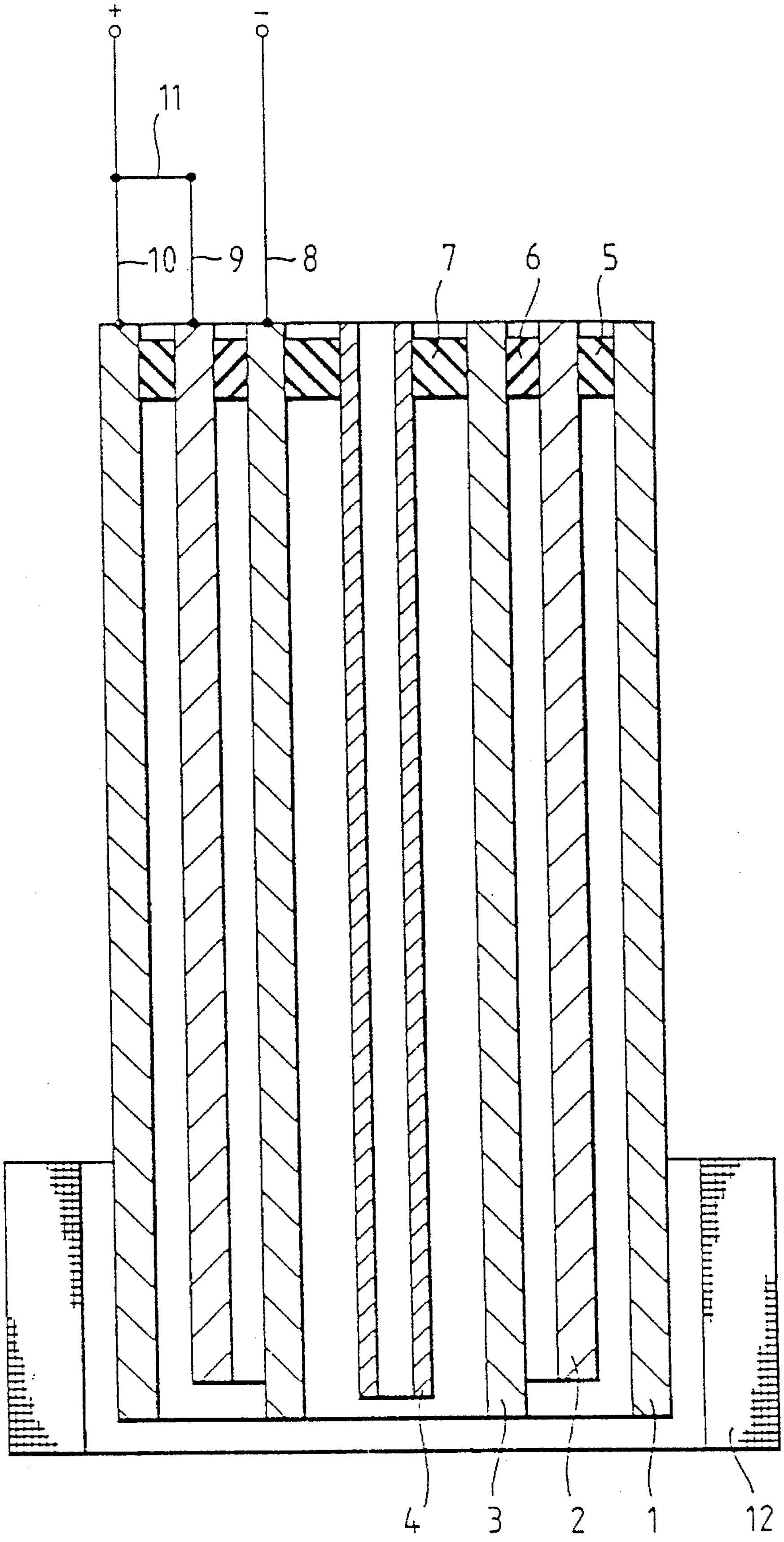
+
-
11
10
9
8
7
6
5
4
3
2
1
12

PLASMA TORCH DEVICE FOR CHEMICAL PROCESSES

FIELD OF THE INVENTION

The present invention concerns a plasma torch preferably for energy supply for chemical processes. The plasma torch is provided with several tubular electrodes which are located coaxially with one another. The electrodes are connected to an electrical power supply. Gas is supplied through the internal electrode and in the spaces between the electrodes. High temperature plasma is formed by means of the gas which is heated by the electric arc which extends between the electrodes.

BACKGROUND OF THE INVENTION

In order to obtain desired chemical reactions in gases or in mixtures of gas and liquid or solid particles, in some cases energy has to be supplied. Some such chemical reactions in gases take place at extremely high temperatures, in the order of 1000 to 3000 degrees. It is also necessary to be able to check the amount and the temperature of the gas in order robe able to control and regulate a chemical process of this kind. By exploiting the technology of heating gas in an electric arc in a plasma torch the above-mentioned requirements can be achieved.

The plasma torches known hitherto have been used first and foremost for heating gas for the purpose of welding and cutting steel, for heating in metallurgical processes and in laboratory experiments. Since they often have a high consumption of plasma gas, as it is the gas transport through the torch which dissipates the heat generated in the arc, in some applications they will be less favourable from the point of view of heat economy.

SUMMARY OF THE INVENTION

The object of the present invention, therefore, is to provide a plasma torch which has good heat economy, long electrode life and an operationally reliable design which is suitable for industrial application.

This object is achieved with a plasma torch which is characterized by the features in the claims presented.

The plasma torch consists of several tubular electrodes located coaxially outside one another. The plasma torch is closed at one end, while the other end is open. The electrodes can be moved axially in relation to one another. The electrodes are preferably electrically insulated from one another and have connections for electrical power. Through the internal electrode and in the space between the electrodes there are provided connections for the introduction of gas. High temperature plasma is formed by the gas which is heated and ionized by the electric arc.

In the invention three or more tubular electrodes are located coaxially outside one another. In its simplest form the torch is provided with three electrodes; a central electrode, then an auxiliary electrode and finally an outer electrode. In other embodiments one or more electrodes may be located coaxially outside the outer electrode. Annular passages are formed between the electrodes. Between the central electrode and in the annular passages plasma-forming gas and/or reactant can be introduced.

An inert gas such as nitrogen or argon, for example, can be used as a plasma-forming gas. Such a gas will not usually participate in or affect the chemical reaction taking place in the torch. The plasma-forming gas can also be the same type of gas which is formed as a product of the reaction in the plasma torch.

The reactant can be pure gas or gas mixed with liquid or solid particles with which it is desirable for chemical reactions to take place in the plasma flame, for example a thermal decomposition. The reactant in itself can also be the plasma-forming gas.

The electrodes in the plasma torch are solid and can be consumable. As an electrode material, it is preferable to use graphite, which has a high melting point and requires little cooling.

This constitutes a substantial simplification of the design of he plasma torch and is important for the improvement of the torch's energy efficiency.

The electrodes can be moved axially in relation to one another. Adjustment of the electrodes in relation to one another offers the possibility of altering the average length of the arc and thereby the working voltage, which in turn has an influence on the heat output. Furthermore, the shape of the arc can be altered. If the external electrode is adjusted in such a manner that it projects outside the central electrode, the plasma zone will become funnel-shaped and convey an intense heat supply to the reactant which is supplied in the centre of the plasma zone. If the central electrode is adjusted in such a manner that it projects outside the external electrode, the plasma zone will assume a pointed shape and transfer a greater proportion of the heat to the surrounding chamber and less directly to the reactant which is supplied in the centre. In this way the axial position of the electrodes can be adjusted according to the properties of the medium which has to be heated.

The plasma torch is supplied with electrical power from a power supply system. The electrodes are connected to the power supply via conductors, cooled if necessary. The plasma torch can be supplied with alternating current or preferably direct current.

The plasma torch's electrodes can be coupled together in two different ways. The auxiliary electrode can either be connected to the central electrode or to the external electrode. When direct current is used, therefore, four different connections can be used.

One possible connection is to connect the auxiliary electrode to the external electrode in such a manner that these two electrodes have the same potential. They are preferably connected to positive voltage as the anode. The central electrode is then connected to negative voltage and is the cathode.

With this connection the polarity can be exchanged to enable the central electrode to be connected to positive voltage as the anode and the two coupled electrodes to be connected to negative voltage as the cathode.

Another possible connection is to couple the auxiliary electrode with the central electrode, so that these two electrodes have the same potential. They are then preferably connected to positive voltage as the anode and the outer electrode to negative voltage as the cathode. With this connection too, the polarity of the electrodes can be exchanged to enable the two coupled electrodes to be connected to negative voltage as the cathode and the outer electrode to positive voltage as the anode.

When the first mentioned connection as described above is used, the external electrode and its holder together with the auxiliary electrode and its holder are preferably at ground potential. Thus there is no danger of the two said electrodes and their holders touching one another. The central electrode and its holder have a certain voltage in relation to ground and are therefore electrically insulated against the equipment used for axial positioning.

The object of designing the torch with an external electrode and an internal auxiliary electrode, wherein both of these electrodes are connected to the same voltage, is to achieve a reliable ignition of the arc and a stable reignition device for the plasma torch.

The auxiliary electrode is of vital importance when starting the torch with cold plasma gas and in order to achieve stable operation at low electrode temperatures.

Tests have also shown that a torch equipped with an auxiliary electrode provides stable operation at lower electrode temperatures than a torch without an auxiliary electrode when one and the same plasma gas is used.

The auxiliary electrode provides a reliable ignition of the torch when the working voltage is connected to the electrodes. The auxiliary electrode is located so close to the central electrode that an electric spark jumps across between them when the voltage is connected and an arc is formed instantaneously. The auxiliary electrode can therefore be characterized as an ignition electrode. The distance which is selected between the electrodes is determined first and foremost by the working voltage, but it is also dependent on other factors such as the type of plasma-forming gas which is used.

Magnetic forces will move the arc to the end of the electrodes and out into the space outside the end of the electrodes, and once an arc is ignited it has the ability to achieve a greater length when the same voltage exists between the electrodes. Thus its foot point on the auxiliary electrode will migrate outwards and it will then jump across to the exterior electrode which has the same potential. Since this event takes very little time, only a small amount of erosion is incurred by the auxiliary electrode compared to the erosion on the outer and central electrodes where the arc has its foot points for most of the time.

The auxiliary electrode can be moved in the axial direction in relation to the external electrode. It is withdrawn during operation, but only far enough to ensure that the surface of the central electrode directly above the end of the auxiliary electrode has a high enough temperature to enable it easily to emit electrons, thus, ensuring reignition. The auxiliary electrode, however, is withdrawn far enough to prevent it from continuously forming the foot point of the arc.

The outer electrode and the auxiliary electrode have the same voltage. The connection can be made inside or outside the torch. If the connection is made in the torch, electrical insulation is not normally used between these two electrodes.

However, a control system can be provided for adjustment of the axial position of the auxiliary electrode, thus minimising the average current intensity through it. The wear on the auxiliary electrode is thereby substantially reduced. The outer and auxiliary electrodes are then electrically insulated from each other. The current through these electrodes can thereby be measured independently of each other and supply values to the control equipment.

It has been found that the arc in plasma torches designed according to the invention is pushed out towards the ends of the electrodes and out into the space outside the ends of them. This is due to the electromagnetic forces created in the arc and to the face that gas which is supplied forces it outwards. Eventually the arc can become so long that it is broken and consequently extinguished.

When the arc is extinguished between the outer electrode and the central electrode, it will immediately be reignited between the auxiliary electrode and the central electrode. In the course of normal operation it has been found that the arc is continuously extinguished and has to be reignited, thus making an auxiliary electrode according to the description absolutely essential for the continuous operation of a plasma torch according to the invention.

The plasma torch is provided with an annular magnetic coil or an annular permanent magnet which is located outside the electrodes, either around the end of the electrodes in the area of the torch where the arc is formed or close to this area. The magnetic coil or permanent magnet are located in such a way that they create an axial magnetic field in this area of the torch, thereby causing the arc to rotate around the torch's centre axis. This is important for the operational stability of the torch.

One or more bodies of a ferromagnetic material can be placed along the torch's centre axis. Such a body will concentrate the magnetic field in the arc's area of operation and if desired conduct the magnetic field from an area with a stronger axial magnetic field to the arc zone. Such bodies and their placement are described in the applicant's Norwegian patent application no. 91 4910.

Furthermore, the magnetic field will prevent the arc from travelling from a specific point on the internal electrode to a specific point on the external electrode, thus causing the formation of craters and lacerations on the surfaces of the electrodes. Under the influence of the magnetic field the arc will rotate along the periphery of these electrodes, thus achieving an even erosion of the electrode surface and substantially reducing the wear on the electrodes. In consequence the power load on the electrodes can be increased.

In the following section the invention will be described in more detail with reference to drawings which illustrate schematically an embodiment of the plasma torch.

BRIEF DESCRIPTION OF THE DRAWING

The FIGURE illustrates a vertical section of a plasma torch according to the present invention.

DETAILED DESCRIPTION OF THE INVENTION

The plasma torch illustrated in FIG. 1 consists of an outer electrode 1, an auxiliary electrode 2 and a central electrode 3. The electrodes are tubular and are located coaxially inside one another. The electrodes can be moved axially in relation to one another. Equipment for axial positioning of the electrodes, for example hydraulic or pneumatic cylinders, is not shown in the FIGURE.

The electrodes are solid and may be consumable, i.e. they can be continuously fed forward as they are eroded or worn out. Thus they do not require internal cooling with coolant, a fact which constitutes a considerable simplification of the plasma torch. All types of electrically conductive non-metallic materials can be used as electrodes, preferably materials with a high melting point such as silicon carbide or graphite. The choice of materials will also be dependent on their durability against the atmosphere in the area of application during the process concerned.

The plasma torch is closed at one end by means of annular insulating discs 5, 6 and 7. The insulating discs serve at the same time as a sealant between the electrodes.

Plasma-forming gas and/or reactant can be supplied between the central electrode 3 and in the annular spaces between the electrodes. The supply tubes for gas to the plasma torch through the insulating discs are not included in the drawing.

The plasma torch is designed to enable a reactant to be supplied through the central electrode 3 in a separate lead-in tube 4. A suitable lead-in tube is, for example, described in the applicant's Norwegian patent application no. 91.4911.

Since the electrodes are preferably consumable, the central electrode 3 can be extended during operation and moved axially, thus enabling its end position to be adjusted as required.

The electrodes are supplied with electrical power from a power supply system which is not shown in the FIGURE. The power supply is fed to the electrodes through cables 8, 9 and 10, which are indicated as lines in the FIGURE.

The outer electrode's cable 10 and the intermediate electrode's cable 9 are coupled together outside the torch by means of an over connection or a junction plate 11. This coupling is performed before the connection of any incorporated measurement instruments for recording the current through the electrodes. The outer electrode 1 and the intermediate electrode 2 thus have the same potential and are preferably connected to positive voltage as the anode. The central electrode 3 is preferably connected to negative voltage as the cathode.

An annular magnetic coil 12 or an annular permanent magnet are located around the electrodes preferably outside the area where the arc is formed. The magnetic coil 12 or permanent magnet will set up an axial magnetic field in this area of the torch.

The auxiliary electrode 2 and the central electrode 3 are so dimensioned that the radial distance between them is small. When the voltage is connected, an electric spark will jump between the electrodes and an arc will be formed. The working voltage and the distance between the electrodes are arranged in such a way that a jump spark will always occur. For this reason, therefore, a reliable ignition of the plasma torch is obtained.

Magnetic forces will move the arc to the end of the electrodes, and once the arc is ignited it has the ability to attain greater length when there is the same voltage between the electrodes. The arc's foot point will migrate beyond the auxiliary electrode 2 in a radial direction and across to the outer electrode 1 which has the same potential. After the arc is ignited it will therefore travel between the central electrode 3 and the outer electrode 1.

The auxiliary electrode 2 can be moved in the axial direction. During operation, it is withdrawn from the plasma zone. The auxiliary electrode 2 is then withdrawn sufficiently far to prevent it from any longer forming the foot point of the arc, which prefers instead to travel from the outer electrode 1 across to the central electrode 3. The optimum position for the auxiliary electrode 2 can be set by means of control equipment which, for example, measures the current through it. The optimum position is attained when the average current intensity through the auxiliary electrode 2 reaches a minimum.

The arc in a plasma torch according to the invention will be pushed out from the end of the electrodes. The reason for this is separate electromagnetic forces in the arc and the gas which flows out into the space between the electrodes and forces the arc outwards. Eventually the arc becomes so long that it is broken and extinguished.

When the arc is extinguished between the external electrode 1 and the central electrode 3, it will immediately be reignited between the auxiliary electrode 2 and the central electrode 3. The field intensity between these electrodes is sufficient to permit electrons to be emitted from the cathode surface, which has a high temperature, thus igniting the arc instantaneously. Thus no interruption of power is registered because the main current will move from the outer electrode 1 to the auxiliary electrode 2.

The arc's foot point will then move from the auxiliary electrode 2 to the external electrode 1. The electrodes have such a high temperature that they emit electrons to the area around them and an arc between the outer electrode 1 and the central electrode 3 is recreated only a few milliseconds after it has been extinguished.

During operation it has been found that the arc is continuously extinguished and reignited as described above. The auxiliary electrode 2 which can also be characterized as an ignition electrode is therefore absolutely essential for the continuous operation of a plasma torch according to the invention.

We claim:

1. A plasma torch for supplying energy, said plasma torch comprising a first, a second and a third tubular electrode with said second and third electrodes being located co-axially inside said first electrode and said third electrode being located inside said second electrode, said electrodes being electrically insulated from one another and having connections for electrical power, said third electrode having a feed-in tube located co-axially therein for supplying a raw material, said electrodes being composed of a non-metallic material with a high melting point and there being provided an annular space between said feed-in tube and said third electrode to provide a path for a plasma-forming gas and a reactant, said electrodes being mounted so as to be moveable relative to one another in an axial direction, said second electrode constituting an ignition electrode and being continuously connected to one of said second and third electrodes having the same polarity and voltage.

2. The plasma torch as claimed in claim 1 wherein a radial distance is provided between the second electrode and said one other of said first or third electrodes so that an electrical spark will jump between said second electrode and said one other of said two electrodes when the voltage is connected to said electrodes.

* * * * *